United States Patent [19]

Kaneko

[11] Patent Number: 4,683,385
[45] Date of Patent: Jul. 28, 1987

[54] PULSE NUMBER DETECTION CIRCUIT
[75] Inventor: Takashi Kaneko, Tokyo, Japan
[73] Assignee: NEC Corporation, Tokyo, Japan
[21] Appl. No.: 688,370
[22] Filed: Jan. 2, 1985
[30] Foreign Application Priority Data
  Jan. 4, 1984 [JP] Japan .................................. 59-162
[51] Int. Cl.⁴ ...................... H03K 5/22; G01R 19/145
[52] U.S. Cl. .................................. 307/518; 307/234;
  328/111
[58] Field of Search ...................... 377/48, 44, 49, 118,
  377/47; 307/518, 522, 234, 463, 265; 328/109,
  110, 111, 112, 134

[56] References Cited
U.S. PATENT DOCUMENTS

4,197,502 4/1980 Sumner et al. ..................... 307/518
4,370,748 1/1983 Janc et al. ........................... 328/109
4,539,694 9/1985 Wattenhofer ....................... 377/44

Primary Examiner—Stanley D. Miller
Assistant Examiner—Timothy P. Callahan
Attorney, Agent, or Firm—Burns, Doane, Swecker & Mathis

[57] ABSTRACT

A pulse number detection circuit used, for example, in a digital audio disk player comprises a counter counting a reference clock signal in synchronism with one inverting edge of the clock signal when an input data signal takes one logic level, first to third detectors producing first to third signals when the count value of the counter is zero, N, and (M+1), respectively, a first flip-flop producing a fourth signal in response to the other inverting edge of the clock signal when the first or second signal is produced, a second flip-flop producing a fifth signal in response to the other inverting edge of the clock signal when the first or third signal is produced, a first output circuit responding to the second and fourth signals and producing a first output signal, and a second output circuit responding to the third and fifth signals and producing a second output signal. This circuit detects that the count value is larger than (M+½) or smaller than (N−½).

6 Claims, 14 Drawing Figures

PULSE NUMBER DETECTION CIRCUIT

BACKGROUND OF THE INVENTION

The present invention relates to a detection circuit for detecting a number of pulses, and more particularly to a circuit detecting the number of data pulses within a predetermined frame which are read-out from a digital equipment such as a digital audio disk player of a compact disk type.

In a digital audio system, audio signal information is recorded into a disk in a form of digital signals, and hence it is read-out from the disk by a pickup as pulse signals. In addition, each digital signal is recorded into the disk such that its pulse width is changed in accordance with the audio signal information. The changeable range of the pulse width is determined in the compact disk type such that three to eleven reference clock pulses exist in the one logic level period of the signal. The reference clock pulse is employed as a system clock of the disk player. Therefore, the data pulses read-out by the pickup have their pulse width which is not constant, but changed, and further the data rate is also varied in response to the rotation speed of the disk.

In order to reproduce audio signals from the read-out data pulse, the rotation speed of the disk should be therefore controlled such that the pulse width of each read-out data pulses is within three to eleven cycle periods of the reference clock signal. Accordingly, a data detection circuit provided for this purpose should count the reference clock signal during one logic level period of each read-out data pulse and detect that the count value is larger than 11.5 or smaller than 2.5. The detection of the count value of 11.5 or 2.5 may be substantially performed by counting clock pulses having a frequency twice as high as that of the reference clock signal and by comparing the actual count value with 23 or 5.

However, the reference clock signal has a frequency of about 5 MHz in the compact disk type, and therefore the frequency of the clock signal to be counted becomes about 10 MHz. For this reason, it is difficult to constitute such high-speed counter by insulated gate field effect transistors (FETs), and it will be composed of the TTL (transistor- transistor-logic) circuit, resulting in increase in the power consumption and the occupied area on a semiconductor integrated circuit chip. Moreover, the number of flip-flop circuits is made large in order to count the clock signals more than 23, and hence the power consumption and the occupied area are further increased.

SUMMARY OF THE INVENTION

An object of the present invention is, therefore, to provide a pulse number detection circuit which is suitable as an integrated circuit device.

Another object of the present invention is to provide a pulse counter circuit constituted by a smaller number of circuit elements.

Still another object of the present invention is to provide a pulse counter circuit which can substantially count a fraction.

A circuit according to the present invention comprises a counter counting a reference clock signal in synchronism with one of the rising and falling edges of the reference clock signal during a period of one logic level of an input data signal, a first detector producing a first signal representing that a count value of the counter is zero, a second detector producing a second signal representing that the count value of the counter is a first value, means for producing a third signal in response to the other of the rising and falling edges of the reference clock signal which appears when the first or second signal is produced, and means responsive to the second and third signals for producing a first output signal.

Since the counter starts to count the reference clock signal in synchronism with one edge of the clock signal and the third signal is produced in response to the other edge of the reference clock signal which appears when the first or second signal is produced, the first output signal is produced only when the count value is larger than $(A-\frac{1}{2})$, where A represents the first count value.

It is favorable that the circuit according to the present invention further comprises a third detector producing a fourth signal representing that the count value of the counter is a second value, means for producing a fifth signal in response to the other edge of the reference clock signal which appears when the first or fourth signal is produced, and means responsive to the fourth and fifth signals for producing a second output signal.

Accordingly, the second output signal is produced only when the count value is larger than $(B-\frac{1}{2})$, where B represents the second count value. In other words, the count value smaller than B is detected.

Assuming that the values of A and B are 12 and 3, respectively, the circuit according to the present invention detects that the count value is larger than 11.5 or smaller than 2.5.

BRIEF DESCRIPTION OF THE DRAWINGS

The above and the other objects, features and advantages of the present invention will be more aparent from the following description taken in conjunction with the accompanying drawings, in which.

DETAILED DESCRIPTION OF THE PREFERRED EMBODIMENT

Figure 1:
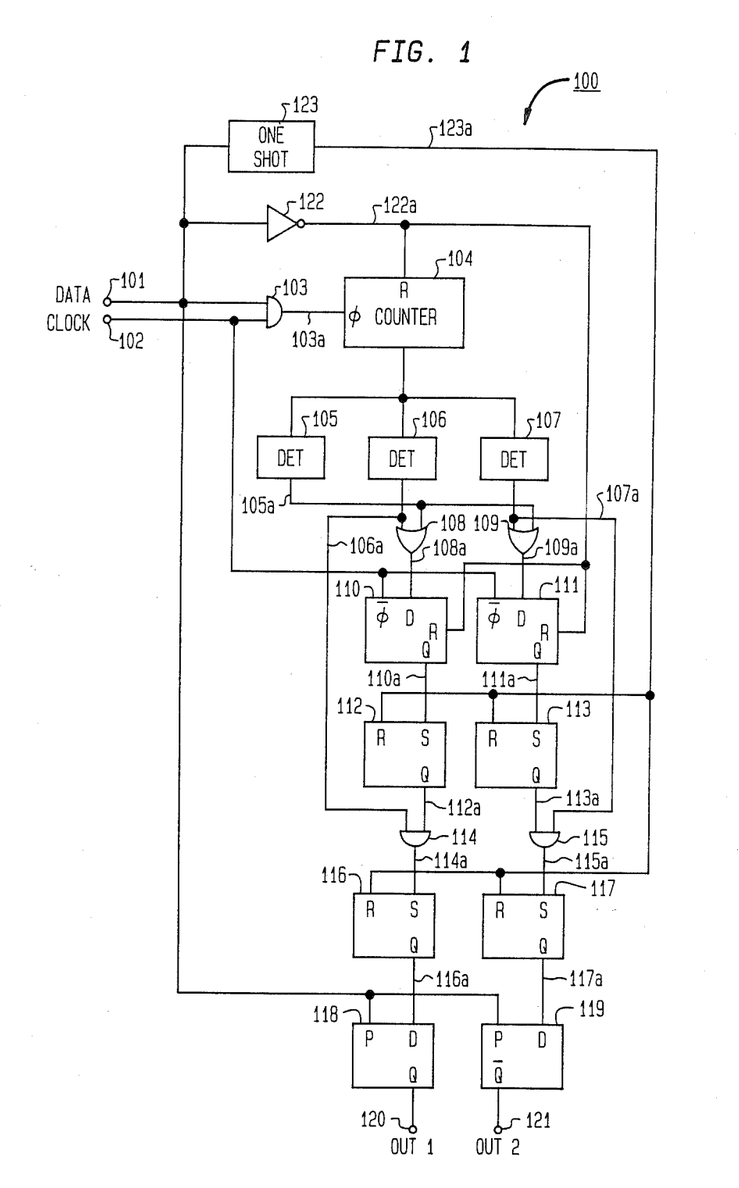
FIG. 1 shows a logic circuit diagram of a data rate detection circuit according to an embodiment of the present invention.

Referring to FIG. 1, there is shown by a reference numeral 100 a data rate detection circuit according to an embodiment of the present invention. This detection circuit 100 includes a data input terminal 101, a reference clock input terminal 102, three AND circuits 103, 114 and 115, an one-shot pulse generator 123, an inverter 122, a counter 104, first, second and third detectors 105, 106 and 107 each detecting the count value of the counter 104, four data type flip-flops (called hereinafter as "D-FF") 110, 111, 118 and 119, four set-reset type flip-flops (called hereinafter as "RS-FF") 112, 113, 116 and 117, and two output terminals 120 and 121.

Data pulses read-out from a disk (not shown) are supplied to the data input terminal 101, and a reference clock signal is supplied to the clock input terminal 102. Since these input terminals 101 and 102 are connected to the AND circuit 103, the reference clock signal appears at the output end 103a of the AND circuit 103 when the input data pulse takes a high level. The output end 103a is connected to the φ-input end of the counter 104. The counter 104 responds to one inverting edge of the reference clock signal appearing at the output end 103a and counts the clock signal during the high level period of the input data. The one inverting edge of the clock signal is defined in this embodiment as a falling edge from the high level to the low level and called hereinafter as a "first edge". The inverter 122 resets the counter 104 during the low level period of the input data pulse. The first detector 105 produces its output 105a of the high level when the content of the counter 104 is zero. The second and third detectors 106 and 107 respond to the count value of the counter 104 and produce their detection outputs 106a and 107a of the high level when the count value is (M+1) and N, respectively. In this embodiment, the values of M and N are 11 and 3, respectively, and hence the second detector 106 detects that the count value is 12.

The OR circuit 108 receives the first and second detection outputs 105a and 106a and supplies its output 108a to the data input end of the D-FF 110. The OR circuit 109 receives the first and third outputs 105a and 107a and supplies its output 109a to the data input end of the D-FF 111. The D-FFs 110 and 111 respond to the other inverting edge of the reference clock signal (that is a rising edge from the low level to the high level and called hereinafter as a "second edge") and latch their input data, respectively. Accordingly, the D-FF 110 produces its output 110a of the high level in response to the arrival of the second edge of the clock signal at a time when the count value of the counter 104 is zero or (M+1) and sets the RS-FF 112 to change its output 112a to the high level. Similarly, the D-FF 111 produces its output 111a of the high level in response to the arrival of the second edge of the clock signal at a time when the count value of the counter 104 is zero or N and sets the SR-FF 113 to change its output 113a to the high level. The D-FFs 110 and 111 are also reset by the output 112a of the inverter 122 during the low level period of the input data, and the RS-FFs 112 and 113 are reset by the one-shot pulse generator 123 which produces its output 123a with a predetermined time delay in response to the inversion of the input data from the high level to the low level.

The AND circuit 114 receives the outputs 106a and 112a of the second detector 106 and the RS-FF 112, and therefore its output 114a takes the high level when the count value of the counter 104 is (M+1) and when the RS-FF 112 is in the set-state by the arrival of the second edge of the clock signal at a time when the count value is zero or (M+1). The RS-FF 116 is set by the high level output 114a and produces its output of the high level in consequence. The AND circuit 115 produces its output 115a of the high level when the count value of the counter 104 is N and the RS-FF 113 is in the set-state, and the RS-FF 117 is thereby set to produce its output 117a of the high level. The φ-input ends of the D-FFs 118 and 119 are supplied with the input data, and hence they latch the outputs 116a and 117a of the RS-FFs 116 and 117, respectively, in response to the falling edge of the input data from the high level to the low level and produce output signals OUT1 and OUT2 at the output terminals 120 and 121, respectively. It is noted that the output terminals 120 and 121 are connected to the Q-output end of the D-FF 118 and the $\overline{Q}$-output end of the D-FF 119, respectively.

Figure 2:
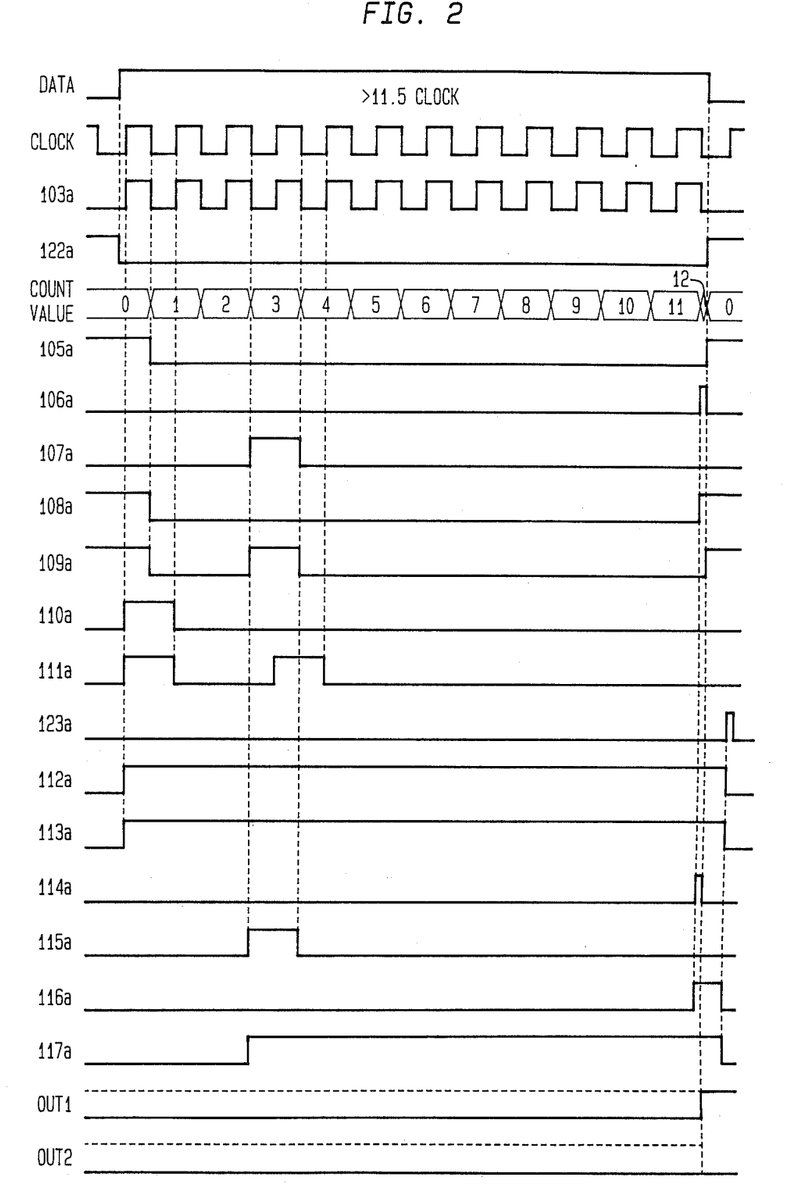
FIGS. 2 to 7 are signal waveform diagrams for explaining the circuit operation of the circuit shown in FIG. 1.
Figure 3:
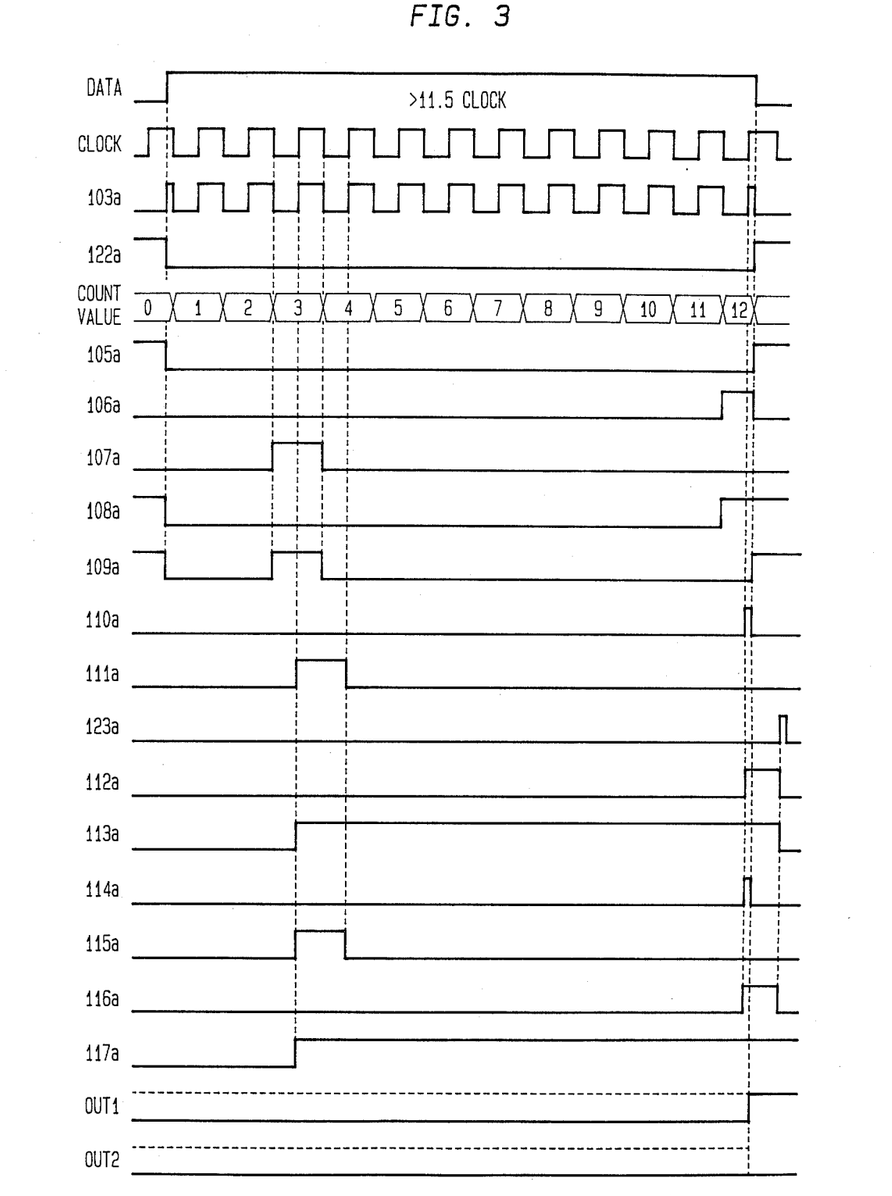

When the pulse width of the input data, i.e., the high level period of the input data, is longer than a time corresponding to (M+½=11.5) reference clock pulses, the counter 104 counts the reference clock pulse more than or equal to (M+1=12) times, and further the second edge of the reference clock pulse appears at the φ-inputs of the D-FFs 110 and 111 after the count value of the counter 104 is N and (zero or M+1), as shown in FIGS. 2 and 3. Accordingly, the outputs 114a and 115a of the AND circuits 114 and 115 takes the high level when the count value is N and M+1, respectively. The outputs 116a and 117a of the RS-FFs 116 and 117 is thereby changed to the high level at a time when the input data changes from the high level to the low level. As a result, the output signal OUT1 takes the high level in synchronism with the invertion of the input data from the high level to the low level. Since the second output terminal 121 is connected to the $\overline{Q}$-output of the D-FF 119, the second output signal OUT2 takes the low level.

Figure 4:
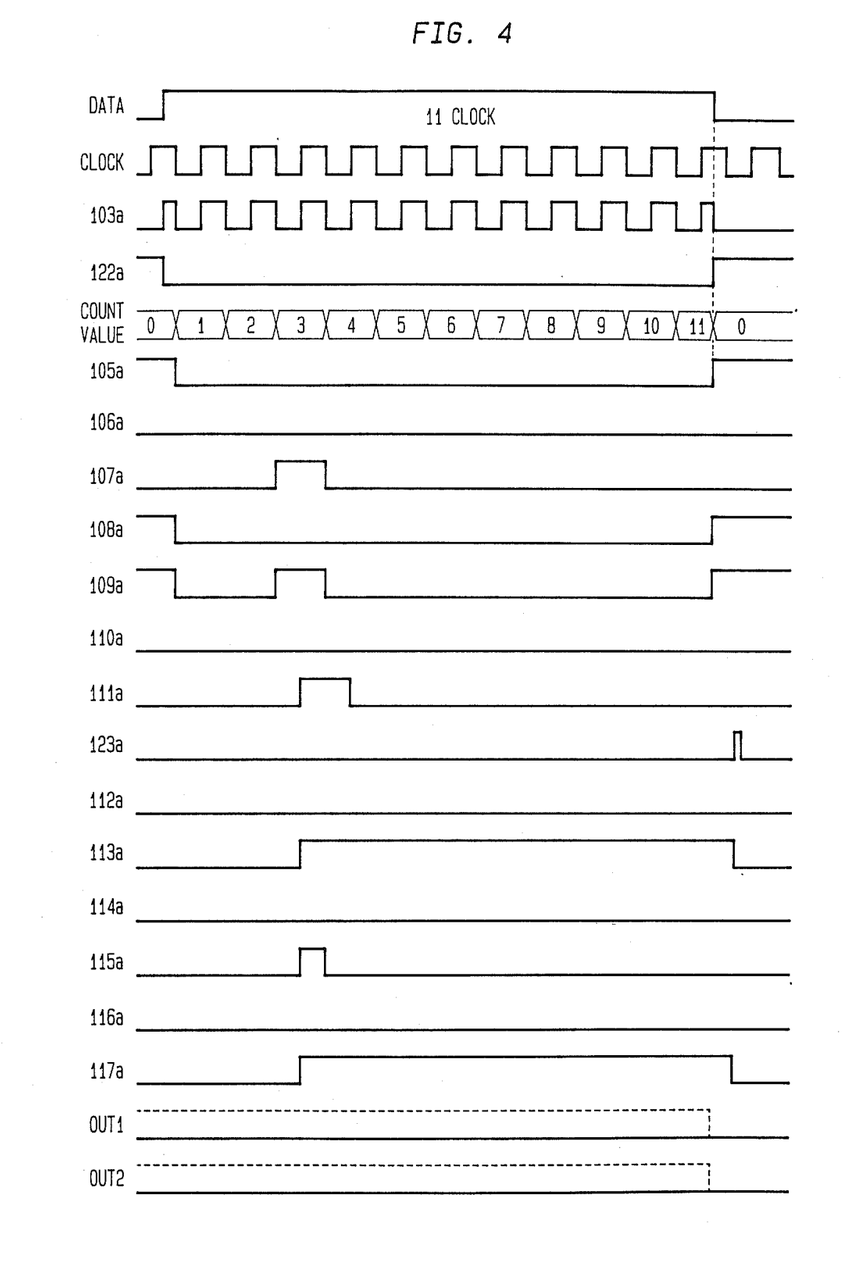
Figure 5:
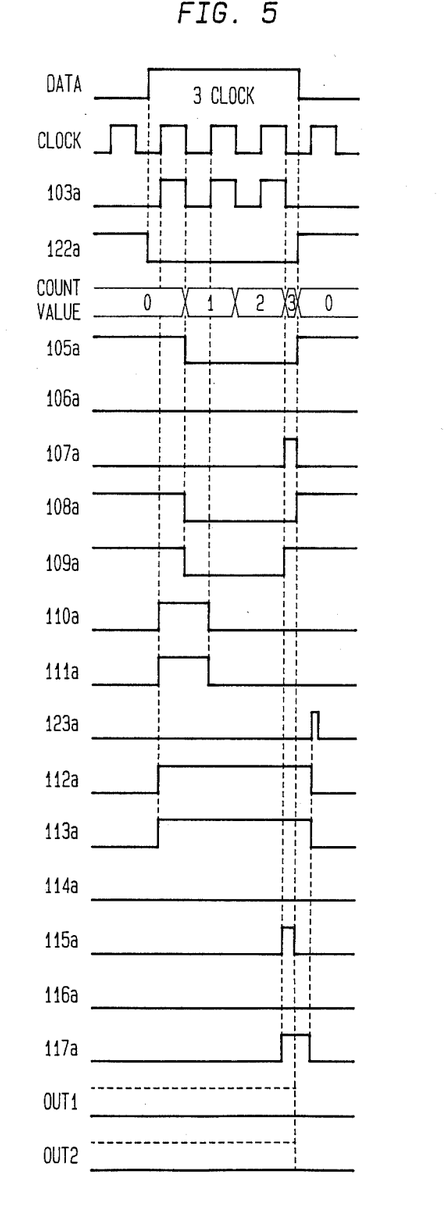

As shown in FIGS. 4 and 5, when the number of the reference clock pulses existing in the high level period of the input data is equivalently N to M (i.e., 3 to 11), the second detector 106 holds its output 106a at the low level. The output 114a of the AND circuit 114 is thereby held at the low level. As a result, the RS-FF 116 is not set, and the first output signal OUT1 takes the low level. On the other hand, the count value of the counter 104 is equal to or larger than N, and the RS-FF 113 is set since the second edge of the clock signal appears at the φ-input of the D-FF 111 after the count value is zero or N. As a result, the RS-FF 117 is set before the input data changes from the high level to the low level, and the second output signals also takes the low level.

Figure 6:
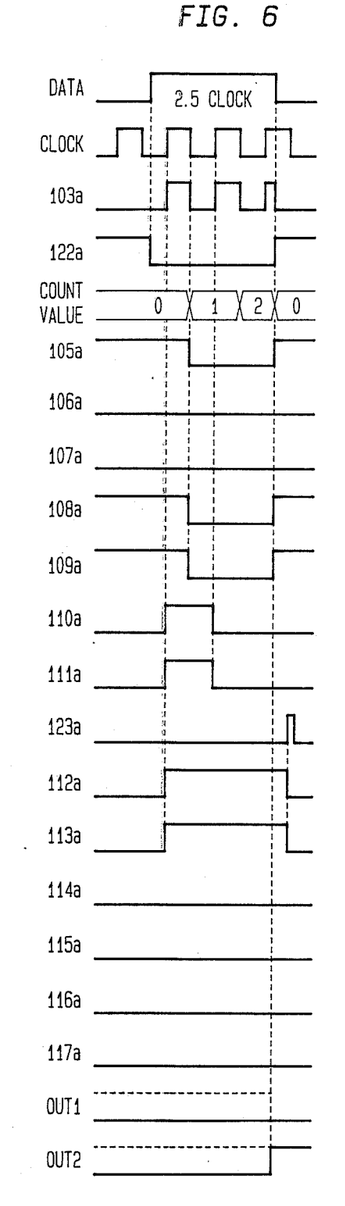
Figure 7:
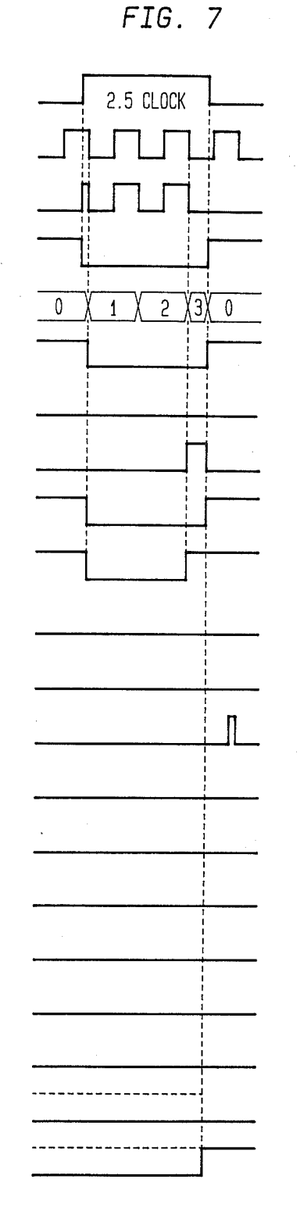

In the case where the high level period of the input data is shorter than a time corresponding to (N−½=2.5) clock pulses, the second and third detectors 106 and 107 hold their outputs 106a and 107a at the low level, respectively, or the second edge of the clock signal does not appear at the φ-input of the D-FF 111 during the high level period of the output 109a of the OR circuit 109, as shown in FIGS. 6 and 7. Accordingly, both of the PS-FFs 116 and 117 are not set, resulting in that the first and second output signals OUT1 and OUT2 take the low level and the high level, respectively.

As described above, the detection circuit shown in FIG. 1 produces the first output signal OUT1 when the pulse width of the input data is larger than 11.5 cycle periods of the reference clock signal and the second output signal OUT2 when the pulse width of the input data is smaller than 2.5 cycle periodes of the reference clock signal.

The counter 104 may respond to the second edge of the reference clock signal to count it, and in that case the D-FFs 110 and 111 respond to the first edge of the reference clock signal to latch the outputs 108a and 109a, respectively.

Figure 8:
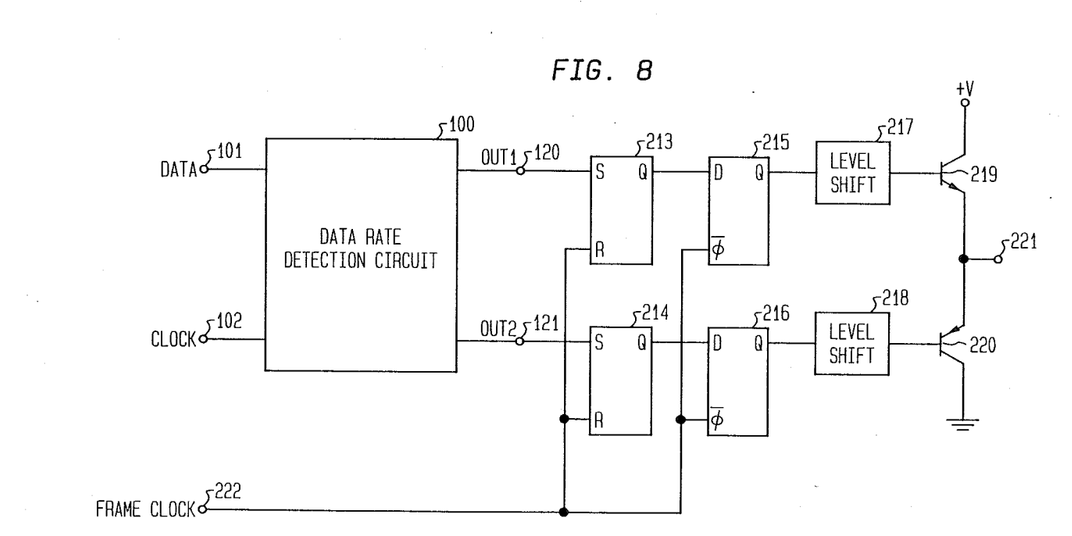
FIG. 8 is a logic circuit diagram of one portion of a speed control circuit using the circuit shown in FIG. 1.

FIG. 8 shows one portion of a speed control circuit used in a digital audio disk player of the compact disk system, which includes the data rate detection circuit 100 shown in FIG. 1, two RS-FFs 213 and 214, two D-FFs 215 and 216, two level shift circuits 217 and 218, an NPN transistor 219, a PNP transistor 220, a current output terminal 221, and a frame clock terminal 222 supplied with a frame clock signal which is derived every one frame of the data signals.

When either one of the output signals 120 and 121 takes the high level within one frame, the associated RS-FF 213 or 214 is set. The Q-outputs of the RS-FFS 213 and 214 are latched by the D-FFs 215 and 216, respectively, in response to the subsequently supplied frame clock signal. Assuming that the D-FF 215 latches the high level, the level shift circuit 217 turns the transistor 219 ON. A current is thereby outputted from the terminal 221 to a spindle motor (not shown) coupled to the terminal 221. As a result, the rotation speed of the motor is made increased. When the D-FF 216 latches the high level, the transistor 220 is turned ON to draw a current from the terminal, resulting in decrease in the rotation speed of the motor. The transistors 219 and 220 may be replaced by field effect transistors.

Figure 9:
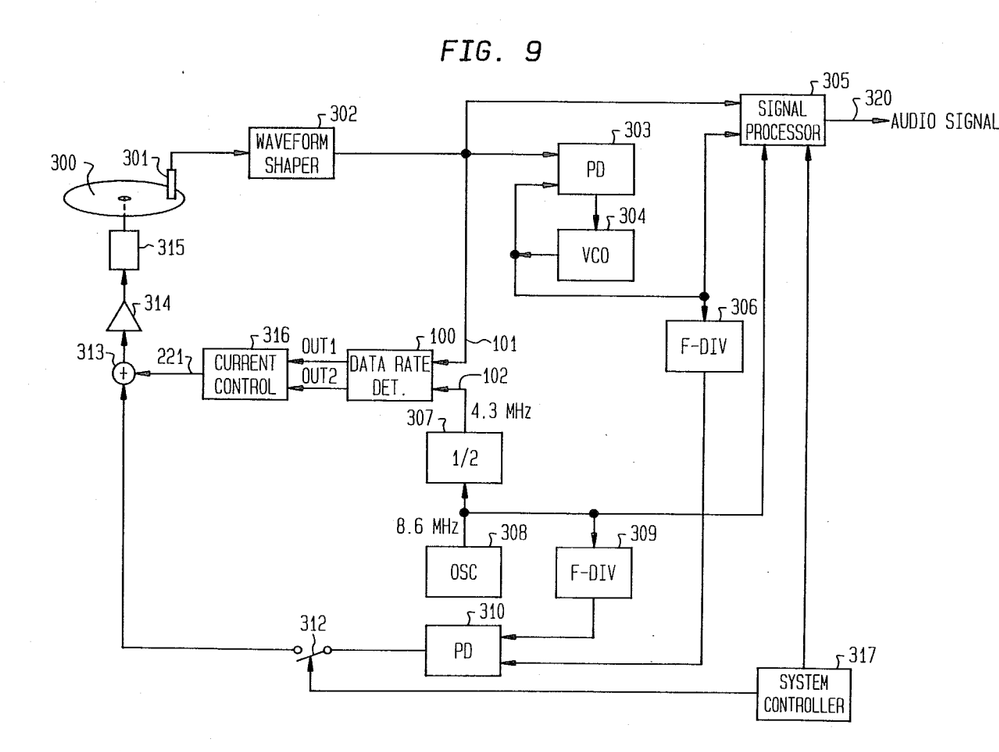
FIG. 9 is a system block diagram of a digital audio disk player of the compact disk type.

In FIG. 9, a system block of the digital audio disk player is shown in order to facilitate the understanding of the function of a speed control circuit using the data rate detection circuit according to the present invention.

A disk 300 is rotated by a spindle motor 315, and data signals recorded on the disk 300 is read-out by a pickup 301. The data signals from the pickup 301 is supplied to a signal waveform shaper 302 which then produces data pulses. The shaper 302 may includes an error correction function. The data pulses are supplied to the data rate detection circuit 100 shown in FIG. 1 at its data input terminal 101. The detection circuit 100 is further supplied at its clock input terminal 102 with a reference clock signal of 4.3 MHz which is derived from a crystal oscillator 308 of 8.6 MHz through a frequency divider 301 having a $\frac{1}{2}$ division ratio. The first and second output signals OUT1 and OUT2 of the circuit 100 are supplied to a current control circuit 316 which is composed of the SF-FFs 213 and 214, the D-FFs 215 and 216, the level shift circuits 217 and 218, and the transistors 219 and 220 as shown in FIG. 8. The output of the circuit 316 is supplied through an adder circuit 313 to a motor drive circuit 314 which controls the rotation speed of the motor 315.

The data pulses from the shaper 302 is further supplied to a phase-detector 203 whose output controls the oscillation frequency of a voltage controlled oscillator (called hereinafter as a "VCO") 304. The output of the VCO 304 is fed back to the phase detector 303 and supplied through a frequency-divider 306 to another phase detector 310. The phase detector 310 is further supplied with the reference clock signal from the oscillator 308 through a frequency divider 309. The output of the phase detector 310 is supplied through a switch 312 to the adder circuit 313. The switch 312 is controlled by a system controller 317. A signal processor 305 receives the data pulses from the shaper 302, the oscillation signal from the VCO 304 a reference clock signal from the oscillator 308 and produces audio signals at its output terminal 320 under the control of the system controller 317.

In operation, when the disk 300 is set on a turn table coupled to the motor 315 and a PLAY switch is operated to reproduce music recorded on the disk, the data rate detection circuit detects whether or not the data rate is within a predetermined range, i.e. the number of the clock signals existing in the high level period of the data pulse is within the range of 3 to 11, and the circuit 316 controls the current supplied to the motor drive circuit 314, as already mentioned in FIGS. 1 to 8. At this time, the controller 317 makes the switch 312 an open state. As a result, the oscillation frequency of the VCO 314 is controlled to reproduce the bit clocks from the data pulses. The bit clocks are necessary to produce the audio signals.

The system controller 317 subsequently turns the switch 312 ON. Accordingly, the output of the phase detector 310 is supplied to the drive circuit 314 as a speed control signal, and the rotation speed of the motor 315 is further controlled such that the phases of the signals from the dividers 306 and 389 are equal to each other. As a result, the phase detector 303 makes the phase of the oscillation signal of the VCO 304 coincident to that of the data signal from the shaper 302. The signal processor 305 thereby produces the audio signals.

The data rate detection circuit 100 continue to operate during a time when the phase locked loop circuit including the phase detector 310 operates, and herefore the erroneous phase lock of the VCO 304 is prevented. Further, even when the pickup 301 moves widely in response to a random access selection operation, the detection circuit 100 rapidly shifts the rotation speed of the motor 315 to the speed relative to the location of the pickup 301 on the disk 300.

Figure 10A:
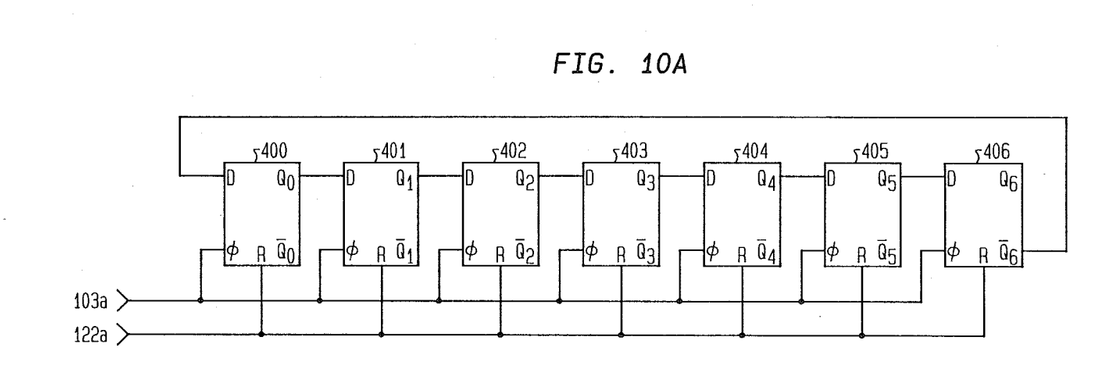
FIG. 10(A) is a logic circuit of a counter and FIGS. 10(B) to 10(D) are three detectors shown in FIG. 1.
Figure 10B:
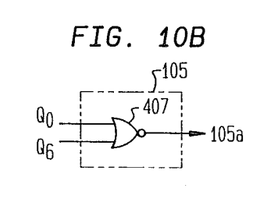
Figure 10C:
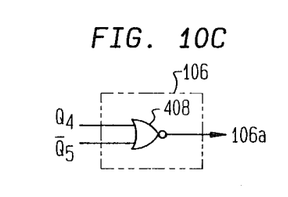

FIG. 10(A) shows a logic circuits of the counter 104 and FIGS. 10(B) to 10(C) show the first to third detectors 105 to 107 shown in FIG. 1. The counter 104 is called as the Johnson counter and composed of seven data type flip-flop (D-FFs) 400 to 406, each of which responds to the first edge (i.e., the falling edge from the high level to the low level) of the clock signal appearing at the output 103a of the AND circuit 103 and latches the data supplied to its data-input D. The Q-output of the preceding D-FF is supplied to the D-input of the next D-FF, but the $\overline{Q}$-output of the last D-FF 406 is supplied to the D-input of the first D-FF 400. Accordingly, the first to last outputs $Q_0$ to $Q_6$ are all "0" (i.e., the low level) in a reset state and change to "1" (i.e., the high level) in that order in accordance with the increase in count value. The outputs $Q_0$ to $Q_6$ all take "1" when the count value becomes 7, and thereafter change to "0" in that order.

Figure 10D:
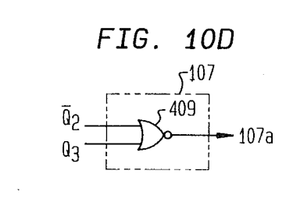

The first to third detectors 105 to 107 are composed of NOR circuits 407 to 409, respectively. When the count value is 0, only the outputs $Q_0$ and $Q_6$ take the low level. Since the NOR circuit 407 receives the outputs $Q_0$ and $Q_6$, and it produces the output 105a of the high level when the count value is 0. Both of the $Q_4$ and $\overline{Q}_5$ outputs take the low level only when the count value is 12, and therefore the NOR circuit 408 produces the high level output 106a in that time. Similarly, the NOR circuit 409 produces the high level output 107a only when the count value is 3, because the $\overline{Q}_2$ and $Q_3$ outputs take the low level in that time.

Figure 11:
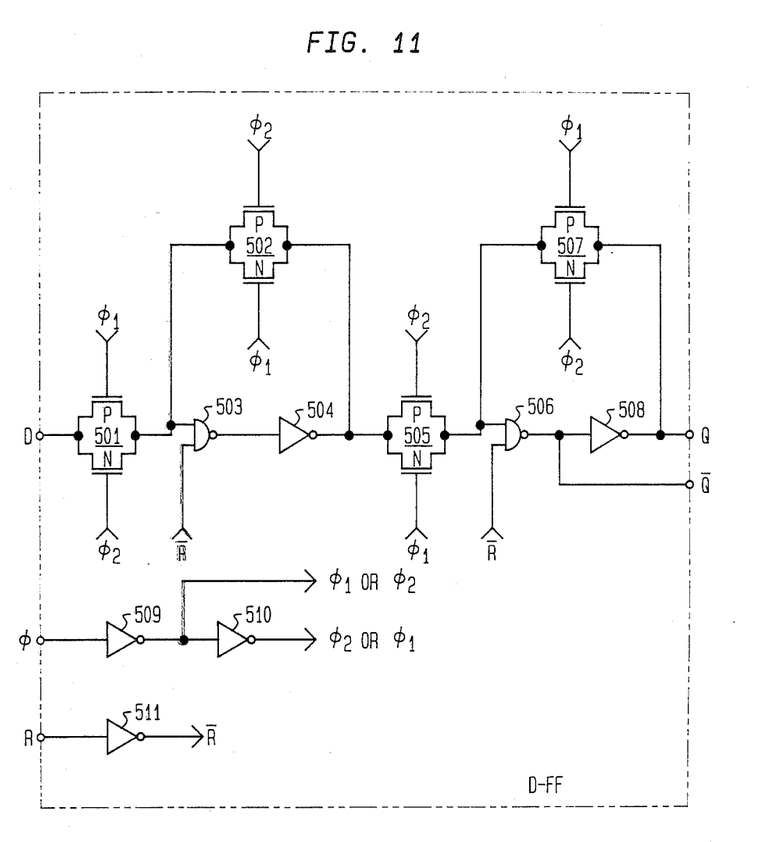
FIG. 11 is a circuit diagram of a data type flip-flop used in the circuits shown in FIGS. 1, 8 and 10(A).

FIG. 11 shows the logic circuit of the D-FF used in FIGS. 1, 8 and 10(A), which includes four transmission gates 501, 502, 505 and 507, two NAND circuit 503 and 506, and five inverters 504, 508, 509, 510 and 511. Each of the transmission gates 501, 502, 505 and 507 consists of a P-channel MOS transistor and an N-channel MOS transistor connected in parallel.

In order that the D-FF operates at the first edge (i.e., the inverting edge from the high level to the low level) of the signal at the $\phi$-input, the outputs of the inverters 509 and 510 are used as $\phi_1$ and $\phi_2$ signals, respectively, and supplied to the $\phi_1$ and $\phi_2$ inputs of each transmission gate, respectively. If the outputs of the inverters 509 and 510 are used as $\phi_2$ and $\phi_1$ signals, respectively, the D-FF operates at the second edge (i.e., the inverting edge from the low level to the high level).

As described above in detail, the circuit according to the present invention detects the data rate without deteriorating the detection sensitivity and constituted of a smaller number of circuit elements. In particular, the counter is composed of a smaller number of flip-flops since the reference clock signal is small in frequency. In addition, each flip-flop can be so-called complementary MOS transistors, and therefore a power consumption and the area of a semiconductor chip are reduced.

The present invention is not limited to the above-described embodiments, but modified and changed without departing from the scope and spirit of the present invention. For example, the Q-output of the D-FF 119 may be used as the second output terminal, and in that case the second output signal OUT2 is derived through an inverter.

What is claimed is:

1. A circuit comprising a first input terminal receiving an input data signal, a second input terminal receiving clock pulses, gate means coupled to said first and second input terminals for transmitting said clock pulses during a period of one logic level of said input data signal, a counter coupled to said gate means for counting the pulses transmitted by said gate means, said counter changing a count value in synchronism with one of a rising and a falling edge of each pulse supplied thereto and generating an output signal representative of its count value, a first detector coupled to said counter and generating a first signal only during a period of time when said counter takes a starting value, a second detector coupled to said counter and generating a second signal only during a period of time when said counter takes a count value of A that is a positive integer other than said starting value, first signal-producing means coupled to said second input terminal and to said first and second detectors for producing a third signal in response to the other of the rising and the falling edge of one of said clock pulses during a period of time when at least one of said first and second signals is generated, a first output terminal, and first output means coupled to said first output terminal, said second detector and said first signal-producing means for producing a first output signal at said first output terminal when both of said second and third signals are generated, whereby said first output signal represents that said period of said one logic level of said input data signal is longer than a period of time equal to A-½ cycles of said clock pulses.

2. The circuit as claimed in claim 1, further comprising a third detector coupled to said counter and generating a fourth signal only during a period of time when said counter takes a count value of B that is a positive integer different from said starting value and said count value A, second signal-producing means coupled to said second input terminal and said first and third detectors for producing a fifth signal in response to the other of the rising and the falling edge of another one of said clock pulses during a period of time when at least one of said first and fourth signals is generated, third signal-producing means coupled to said third detector and said second signal-producing means for producing a sixth signal in response to production of both of said fourth and fifth signals, a second output terminal, and second output means coupled to said first input and second output terminals and to said third signal-producing means for generating a second output signal at said second output terminal when said input data signal changes from said one logic level to the other logic level during a period of time when said third signal-producing means does not produce said sixth signal, said second output signal representing that said period of said one logic level of said input data signal is shorter than a period of time equal to B-½ cycles of said clock pulses.

3. A circuit comprising a first input terminal receiving an input data signal, a second input terminal receiving clock pulses in a reference cycle period, gate means coupled to said first and second input terminals for transmitting said clock pulses during a period of one logic level of said input data signal, a counter coupled to said gate means for counting the pulses transmitted by said gate means, said counter changing a count value in synchronism with one of a rising and a falling edge of each pulse supplied thereto and generating an output signal representative of its count value, a first detector coupled to said counter and generating a first signal only during a period of time when the count value of said counter is equal to zero, a second detector coupled to said counter and generating a second signal only during a period of time when the count value of said counter takes a value of B that is a positive integer other than zero, first signal-producing means coupled to said second input terminal and to said first and second detectors for producing a third signal when the other of the rising and the falling edge of one of said clock pulses appears during a period of time when at least one of said first and second signals is generated, second signal-producing means coupled to said second detector and said first signal-producing means for producing a fourth signal in response to production of both of said second and third signals, a first output terminal, and first output means coupled to said first input and first output terminals and to said second signal-producing means for generating a first output signal at said first output terminal when said input data signal changes from said one logic level to the other logic level during a period of time when said second signal-producing means does not produce said fourth signal, said second output signal representing that said period of said one logic level of said input data signal is shorter than a period of time equal to said reference cycle period multiplied by B-½.

4. The circuit as claimed in claim 3, further comprising a third detector coupled to said counter and generating a fifth signal only during a period of time when the count value of said counter takes a value of A that is a positive integer other than zero and said value B, third signal-producing means coupled to said input terminal and to said first and third detectors for producing a sixth signal when the other of the rising and the falling edge of another one of said clock pulses appears during a period of time when at least one of said first and fifth signals is generated, a second output terminal, and second output means coupled to said second output terminal and to said third detector and said second signal-producing means for producing a second output signal at said second output terminal when both of said fifth and sixth signals are generated, said second output signal representing that said period of said one logic level of said input data signal is longer than a period of time equal to said reference cycle period multiplied by A-½.

5. A circuit comprising a first input terminal receiving an input data signal, a second input terminal receiving clock pulses in a reference cycle period, gate means coupled to said first and second input terminals for transmitting said clock pulses during a period of one logic level of said input data signal, a counter coupled to said gate means for counting the pulses transmitted by said gate means, said counter changing a count value in synchronism with one of a rising and a falling edge of each pulse supplied thereto and generating its output signal representative of its count value, a first detector coupled to said counter and generating a first signal only during a period of time when the count value of said counter is equal to zero, a second detector coupled to said counter and generating a second signal only during a period of time when the count value of said counter takes a value of A that is a positive integer other than zero, first signal-producing means coupled to said second input terminal and to first and second detectors for producing a third signal when the other of the rising and the falling edge of one of said clock pulses appears during a period of time when at least one of said first and second signals is generated, a first output terminal, first output means coupled to said first output terminal and to said second detector and said first signal-producing means for producing a first output signal at said first output terminal when both of said second and third signals are generated, said first output signal representing that said period of said one logic level of said input data signal is longer than a period of time equal to said reference cycle period multiplied by A-?, a third detector coupled to said counter and generating a fourth signal only during a period of time when the count value of said counter takes a value of B that is a positive integer other than zero and said value A, second signal-producing means coupled to said second input terminal and to said first and third detectors for producing a fifth signal when the other of the rising and the falling edge of another one of said clock pulses appears during a period of time when at least one of said first and fourth signals is generated, third signal-producing means coupled to said third detector and said second signal-producing means for producing a sixth signal in response to production of both of said fourth and fifth signals, a second output terminal, and second output means coupled to said first input and second output terminals and to said third signal-producing means for generating a second output signal at said second output terminal when said input data signal changes from said one logic level to the other logic level during a period of time when said third signal-producing means does not produce said sixth signal, said second output signal representing that said period of said one logic level of said input data signal is shorter than a period of time equal to said reference cycle period multiplied by B-½.

6. The circuit as claimed in claim 5, wherein said value A is 12 and said value B is 3.

* * * * *